US008458807B2

(12) United States Patent
Ishiguro

(10) Patent No.: US 8,458,807 B2
(45) Date of Patent: Jun. 4, 2013

(54) IMAGE PROCESSING APPARATUS AND COPY MACHINE CONTROL METHOD

(75) Inventor: Kazuhiro Ishiguro, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1202 days.

(21) Appl. No.: 12/314,762

(22) Filed: Dec. 16, 2008

(65) Prior Publication Data

US 2009/0165122 A1 Jun. 25, 2009

(30) Foreign Application Priority Data

Dec. 20, 2007 (JP) ................................ 2007-329362

(51) Int. Cl.
*G06F 7/04* (2006.01)
*G06F 12/14* (2006.01)

(52) U.S. Cl.
USPC ............... 726/28; 726/19; 713/176; 358/1.14

(58) Field of Classification Search
None
See application file for complete search history.

(56) References Cited

U.S. PATENT DOCUMENTS

| 6,738,491 | B1 | 5/2004 | Ikenoue et al. | |
|---|---|---|---|---|
| 7,911,653 | B2 * | 3/2011 | Saito | 358/3.28 |
| 2004/0184065 | A1 | 9/2004 | Guan et al. | |
| 2006/0238824 | A1 | 10/2006 | Otake et al. | |
| 2006/0256409 | A1 * | 11/2006 | Hiramatsu | 358/538 |
| 2007/0253018 | A1 * | 11/2007 | Doui | 358/1.15 |

FOREIGN PATENT DOCUMENTS

| JP | 6-020027 | 1/1994 |
|---|---|---|
| JP | 2002-305646 | 10/2002 |
| JP | 2004-201069 | 7/2004 |
| JP | 2005-148393 | 6/2005 |
| JP | 2006-166139 | 6/2006 |
| JP | 2006-295857 | 10/2006 |
| JP | 2006-303870 A | 11/2006 |
| JP | 2006-319422 | 11/2006 |
| JP | 2007-019734 | 1/2007 |
| JP | 2007-074048 | 3/2007 |
| JP | 2007-150517 | 6/2007 |
| JP | 2007-201850 | 8/2007 |
| JP | 2007-300442 | 11/2007 |

OTHER PUBLICATIONS

Office Action (Pretrial Report) dated Oct. 29, 2010, issued in the corresponding Japanese Patent Application No. 2007-329362, and a Partial English Translation thereof.

Notification of Reason (s) for Refusal issued in the corresponding Japanese Patent Application No. 2007-329362 dated Nov. 4, 2009, and an English Translation thereof.

(Continued)

*Primary Examiner* — Kaveh Abrishamkar
(74) *Attorney, Agent, or Firm* — Buchanan Ingersoll & Rooney PC

(57) ABSTRACT

An image processing apparatus is an image processing apparatus capable of reading a security paper document that has a ground design pattern and performing image processing, and is provided with: a second modification processing unit that visualizes a latent image included in the ground design pattern; a first modification processing unit that performs a modification process so that the latent image included in the ground design pattern is not visualized; a CPU that performs authentication regarding whether or not a user of the security paper document is an authorized user; and a CPU that performs control so that the first modification processing unit performs modification processing and the latent image is not visualized, or performs control so that the latent image is not visualized by the second modification processing unit, in the case where the user has been authenticated as an authorized user of the security paper document.

18 Claims, 6 Drawing Sheets

OTHER PUBLICATIONS

Office Action (Interrogation) dated Mar. 22, 2011, issued in the corresponding Japanese Patent Application No. 2007-329362, an and English Translation thereof.

Office Action (Notification of Reason(s) for Refusal) dated Oct. 18, 2011, issued in the corresponding Japanese Patent Application No. 2007-329362, and an English Translation thereof.

* cited by examiner

IMAGE PROCESSING APPARATUS AND COPY MACHINE CONTROL METHOD

This application is based on Japanese patent application No. 2007-329362 filed on Dec. 20, 2007, the contents of which are hereby incorporated by reference.

BACKGROUND OF THE INVENTION

1. Field of the Invention

The present invention relates to an image processing apparatus used in an image forming apparatus such as an MFP and to a copy machine control method.

2. Description of the Related Art

In recent years, techniques that exploit the visual sensory characteristics of humans to insert digital watermarks into the images of documents are being used in the realm of image formation. Inserting a digital watermark makes it possible to confirm a document's authenticity, display a warning indicating that copying the document is prohibited, add various types of auxiliary information, or carry out device control.

Conventionally, in copy machines provided with multiple functions, which are known as MFPs (multi-function peripherals), additional information is created using plural types of dots of differing sizes, and this additional information is synthesized with and embedded into the image of a document. For example, two types of dots with differing sizes are used, where a background is formed using the smaller dots, and embedded characters are formed using the larger dots. The background and embedded characters created using these two types of dots are synthesized with the image of a document as a ground design.

In order to prevent the unauthorized duplication of sensitive documents, ground designs, predetermined additional information, and the like, such as those described above, are added to the sensitive documents in advance.

For example, JP H06-20027A proposes an image processing apparatus capable of preventing the unauthorized distribution of sensitive documents, in which in the case where a determination means scans additional information of a document and has determined that the document is a sensitive document, a control means controls the copying operation of the document so that blank paper is outputted.

Meanwhile, JP 2006-295857A proposes an image forming apparatus in which, when a color duplicate of a sensitive paper document on which a ground design has been printed is made, a background portion of the ground design is caused to disappear, thereby causing a latent image portion of the ground design to appear with clarity. The image forming apparatus is thus capable of implementing duplication restriction effects provided by the ground design.

Furthermore, JP 2007-19734A proposes an image forming apparatus in which a latent image pattern composed of a character string, a pattern, or the like can be distinguished from a background pattern and appear in a clearly visible state, even if a background removal process, which takes the background pattern as a base pattern and deletes it, has been turned off by a user.

However, according to the methods disclosed in the documents described above, the latent image is reproduced in the copy, and thus characters such as "copying prohibited" or the like will appear in the ground design, even if the user is an authorized user. This runs contrary to the original intent of the authorized user.

SUMMARY

Having been conceived in light of such a problem, it is an object of the present invention to ensure that a latent image is not reproduced in a duplicate, and that a duplicate identical to the original document in appearance can be obtained, when a user has been authenticated as an authorized user.

An image processing apparatus according to one aspect of the present invention is an image processing apparatus capable of reading a document that has a ground design and carrying out image processing. The apparatus includes a latent image visualizing portion that visualizes a latent image included in the ground design, a first modification processor that carries out a modification process so that the latent image included in the ground design is not visualized, an authenticating portion that performs authentication regarding whether or not a user is an authorized user of the document, and a controller that performs control so that the modification process is performed by the first modification in order for the latent image included in the ground design not to be visualized, or performs control so that the latent image included in the ground design is not visualized by the latent image visualizing portion, only when the user has been authenticated as an authorized user of the document.

Preferably, the authenticating portion includes a detector that detects a specific pattern included in the ground design, and a password extractor that extracts a password from the specific pattern included in the ground design for authenticating a user as an authorized user of the document, and the user is authenticated as an authorized user of the document in the case where a password inputted by the user conforms with the password extracted by the password extractor.

According to the structure described above, it is possible to ensure that a latent image is not reproduced in a duplicate, and that a duplicate identical to the original document in appearance can be obtained, when a user has been authenticated as an authorized user.

DESCRIPTION OF THE PREFERRED EMBODIMENTS

With an image forming apparatus (copy machine) that uses an image processing apparatus according to an embodiment of the present invention, a document having a ground design that includes a latent image is read by a reading unit (a scanner) and image data thereof is generated. After this, authentication regarding whether or not a user of the document is an authorized user is carried out based on an input made by the user him/herself. If the user has been authenticated as an authorized user, the image data is modified so that the latent image does not appear, and the modified image data is then printed.

Figure 1:
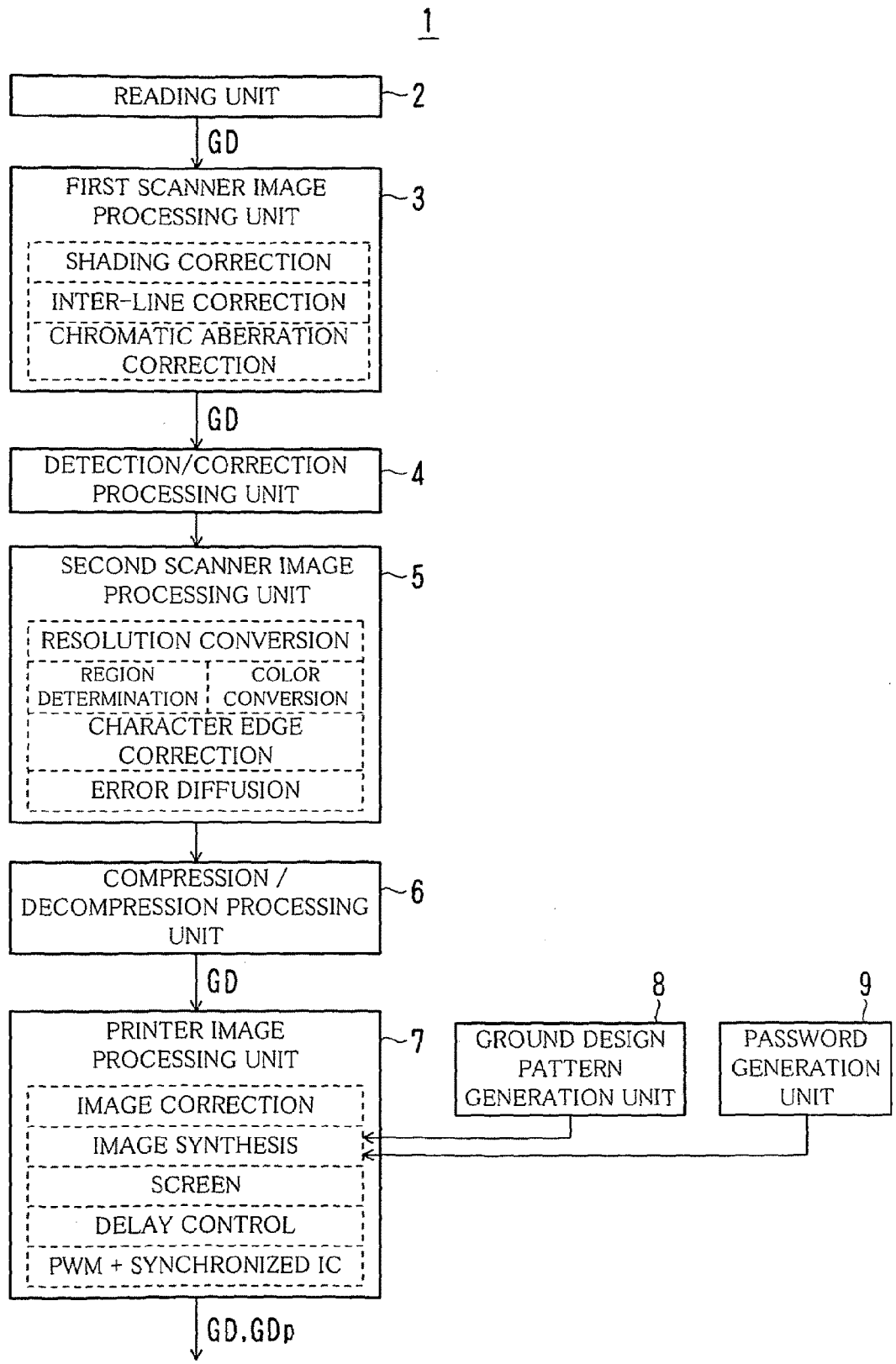
FIG. 1 is a block diagram illustrating an overall configuration of an image processing apparatus according to an embodiment of the present invention.
Figure 2:
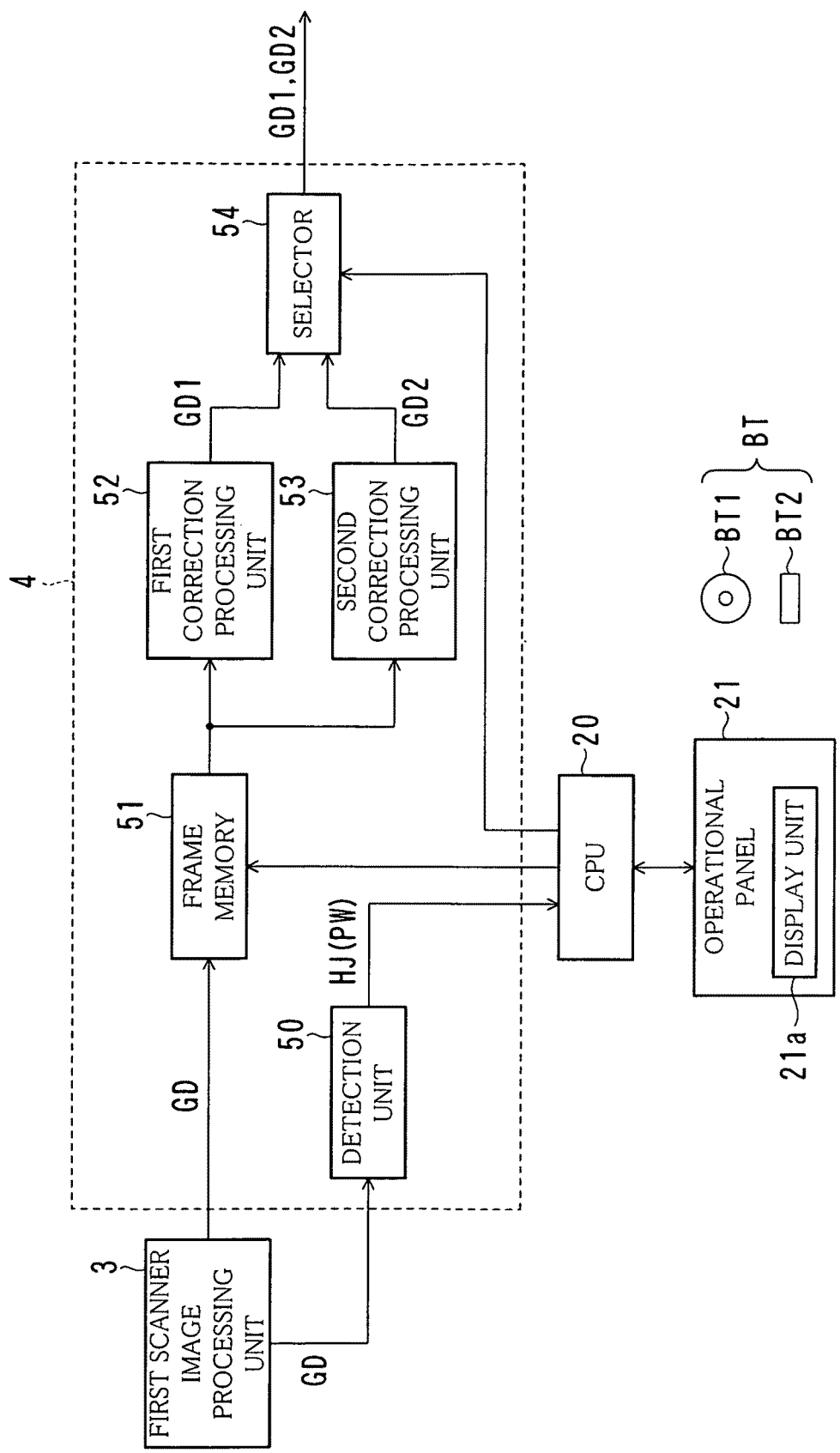
FIG. 2 is a block diagram illustrating a configuration of a detection/modification processing unit shown in FIG. 1.

FIG. 1 is a block diagram illustrating an overall configuration of an image processing apparatus 1 according to the present embodiment, and FIG. 2 is a block diagram illustrating a configuration of a detection/modification processing unit 4 shown in FIG. 1.

The image processing apparatus 1 according to the present embodiment is used in an image forming apparatus such as an MFP (multi-function peripheral), in which a scanner unit and a printer unit are integrated into a single unit.

As illustrated in FIG. 1, the image processing apparatus 1 according to the present embodiment is configured of: a reading unit 2 made up of a CCD (charge-coupled device), a mirror, a document glass, and so on; a first scanner image processing unit 3; the detection/modification processing unit 4; a second scanner image processing unit 5; a compression/decompression processing unit 6; a printer image processing unit 7; a ground design pattern generation unit 8; and a password generation unit 9.

CPU's, memories, other types of circuit elements, and so on are used for the constituent elements of the image processing apparatus 1 described above. These may be entirely or partially integrated as IC's and used as, for example, microprocessors, ASIC's (Application-Specific Integrated Circuits), or the like.

A computer program for implementing the functionality of the detection/modification processing unit 4 and the like is loaded in the memory of the image processing apparatus 1. This type of program can be installed from a portable recording medium BT, which includes a recording medium BT1, such as a CD-ROM, DVD-ROM, or the like, or a recording medium BT2, such as a semiconductor memory or the like, the recording medium having the program recorded therein. The program may also be downloaded from a server via a network.

The reading unit 2 scans a document and generates image data GD. The first scanner image processing unit 3 executes shading modification, inter-line modification, chromatic aberration modification, and the like on the image data GD generated by the reading unit 2.

"Shading modification" refers to modifying what is known as "scanner irregularities" in the image data GD (e.g. variations in the sensitivities of the pixels in the CCD, irregularities in the light distribution, and so on). "Inter-line modification" refers to modifying phase shift in R, G, and B color signals (data) arising due to positional shift between the R, G, and B lines in the CCD. This modification is performed by delaying the R and G components of the image data GD using a filed memory. Finally, "chromatic aberration modification" refers to modifying phase shift in the image data GD arising due to chromatic aberration in a lens system.

The detection/modification processing unit 4 detects the presence/absence of a specific pattern in the image data GD, and modifies the image data GD based on the results of the detection (this refers to a first modification process and a second modification process, which shall be mentioned later).

The "specific pattern" is made up of a ground design pattern that includes secret information such as a password (security code) for authenticating an authorized user, a security level, and so on, and is a pattern provided in order to prevent unauthorized copying. The ground design pattern is therefore sometimes called an "unauthorized copy code". Note that the specific pattern is provided in a document in which a latent image (described later) made up of characters reading "copying prohibited" or the like has been formed.

The second scanner image processing unit 5 performs resolution conversion, regional determination (that is, determining characters), color conversion, character edge modification, error diffusion, and other such processes on the image data GD processed as described above.

"Resolution conversion" refers to converting the resolution of the image data GD to a resolution that fits a display unit (liquid-crystal display) 21a provided in an operational panel 21 (mentioned later), in accordance with the imaging mode set in the apparatus itself. This resolution conversion involves reducing the resolution of the image data GD through decimation or increasing the resolution of the image data GD through interpolation.

"Regional determination" refers to dividing the image data GD according to attributes such as characters, photographs, dotted areas, and so on. "Color conversion" refers to a process for converting the image data GD from the RGB color system to image data in the Y (yellow), M (magenta), C (cyan), K (black) color system.

"Character edge modification" refers to modification that emphasizes the edges of characters. "Error diffusion" refers to a process for reproducing an original half-tone image, such as a photographic image, at lower values. In this error diffusion process, reduced-value data is created by reducing the gradation level of the original image values based on a constant threshold, and the error arising between the data value (luminance value) of a pixel of interest and the luminance value of the reduced-value data corresponding thereto is distributed by weighting plural peripheral pixels within a constant range.

The compression/decompression processing unit 6 compresses the image data GD according to a predetermined format, and stores the compressed image data GD in a memory (not shown). The compression/decompression processing unit 6 also reads out the image data GD stored in the memory and decompresses (unzips) that data.

The printer image processing unit 7 performs a predetermined image modification, image synthesis, screen control, delay control, and PWM control on the image data GD. "Image synthesis" refers to synthesizing a ground design pattern generated by the ground design pattern generation unit 8 and a password generated by the password generation unit 9 with the image data GD.

The ground design pattern generation unit 8 generates a ground design pattern to be synthesized with the image data GD by the printer image processing unit 7. The password generation unit 9 generates a specific pattern including a password to be synthesized with the image data GD by the printer image processing unit 7. The ground design pattern generation unit 8 and the password generation unit 9 are employed when generating image data GDp that includes the specific pattern by adding the ground design pattern and the password to the image data GD.

An outline of processing performed by the image processing apparatus 1 according to the present embodiment shall now be described.

In the present embodiment, it is determined whether or not a specific pattern TP is present in the image data GD. If the specific pattern TP is present in the image data GD, and a password inputted by a user conforms with a password PW included in the specific pattern TP, a first modification process is executed on the image data GD so that a latent image made up of characters reading "copying prohibited" or the like is not reproduced in the duplicate obtained as a result of copying the original document.

On the other hand, if the specific pattern TP is not present in the image data GD, a second modification process is executed on the image data GD so that the latent image made up of characters reading "copying prohibited" or the like is reproduced in the duplicate. The first modification process and the second modification process shall be described later.

Meanwhile, in a case such as where the specific pattern TP is present in the image data GD but the password PW is not included in the specific pattern TP, password authentication fails, or the like, a message reading "copying prohibited" or the like is displayed in the display unit 21a of the operational panel 21. The user cannot make copies in such a case.

In this manner, the image processing apparatus 1 has a function by which the abovementioned latent image is not reproduced in a duplicate in the case where the user has been authenticated as an authorized user. Therefore, it is possible to ensure that the latent image is not reproduced in a duplicate, and that a duplicate identical to the original document in appearance can be obtained, when a user has been authenticated as an authorized user. As a result, the duplicated image is easy for an authorized user to see in the duplicate.

As illustrated in FIG. 2, the detection/modification processing unit 4 is configured of a detection unit 50, a frame memory 51, a first modification processing unit 52, a second modification processing unit 53, and a selector 54. The second modification processing unit 53 corresponds to a latent image visualizing portion. It should be noted that in some cases, the latent image visualizing portion includes the reading unit 2. Although this shall also be mentioned later, this is because the latent image is sometimes reproduced due to the reduction of disappearing dots that make up the latent image, which occurs when the document is read by the reading unit 2.

The detection unit 50 detects whether the specific pattern TP is present/absent in the image data GD, and if the specific pattern TP is present, detects secret information HJ from the specific pattern TP. Note that in the present embodiment, copying operations are temporarily suspended in the case where the secret information HJ has been detected by the detection unit 50.

A CPU (central processing unit) 20 extracts the password PW included in the secret information HJ detected by the detection unit 50. The frame memory 51 holds the image data GD until permission is granted by the CPU 20.

When the CPU 20 has extracted the password PW from the secret information HJ, a message requesting the user to input a password is displayed in the display unit 21a of the operational panel 21. In other words, it is confirmed whether or not the current user is an authorized user.

If the password inputted by the user conforms with the password PW included in the secret information HJ, the CPU 20 assumes that the password authentication has been a success, or in other words, that the user is an authorized user, and thus permits the output of the image data GD held in the frame memory 51.

To put it differently, the CPU 20 controls the selector 54 so that image data GD1, which has undergone the first modification process performed by the first modification processing unit 52, is outputted.

Meanwhile, in a case such as where the CPU 20 has extracted the password PW from the secret information HJ but the password inputted by the user does not conform with the password PW included in the secret information HJ (i.e. password authentication fails), the password PW is not present in the secret information HJ, and the like, the CPU 20 does not output the image data GD stored in the frame memory 51. Note that in such a case, a different process (such as a process for displaying a message in the display unit 21a) may be executed instead.

Furthermore, if the specific pattern TP is not present in the image data GD, the CPU 20 controls the selector 54 so that image data GD2, which has undergone the second modification process performed by the second modification processing unit 53, is outputted.

Figure 3:
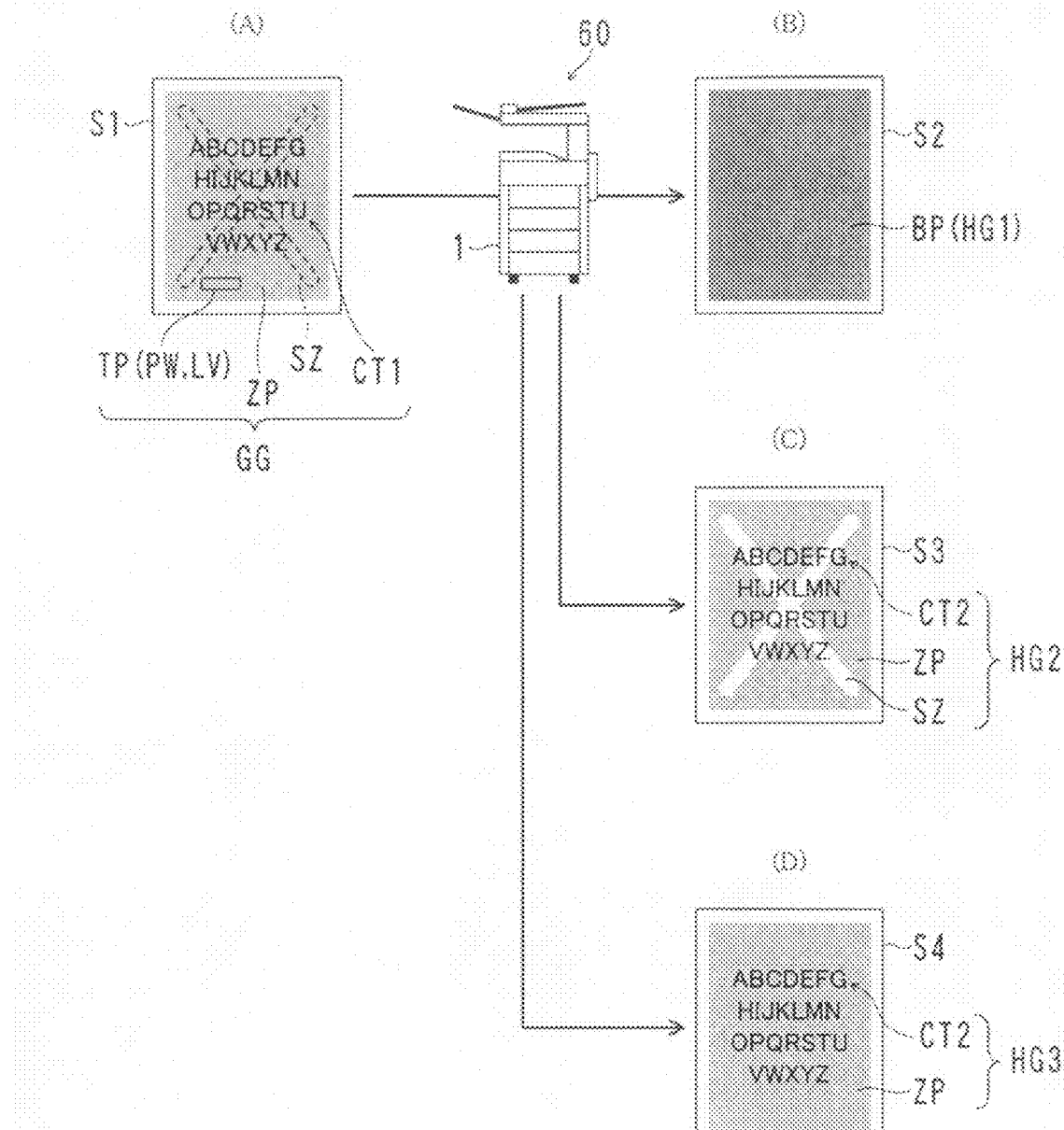
FIG. 3 is a diagram illustrating an operation for duplicating a document performed by the image processing apparatus according to an embodiment of the present invention.
Figure 4A:
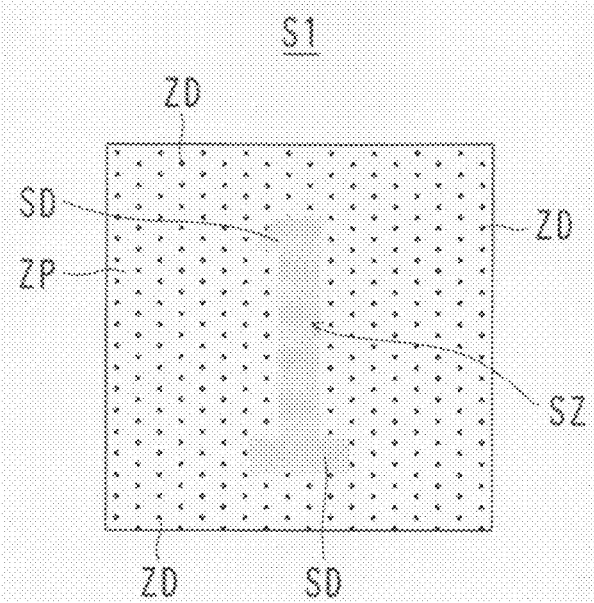
FIGS. 4A and 4B are diagrams illustrating the reproduction of a latent image.
Figure 4B:
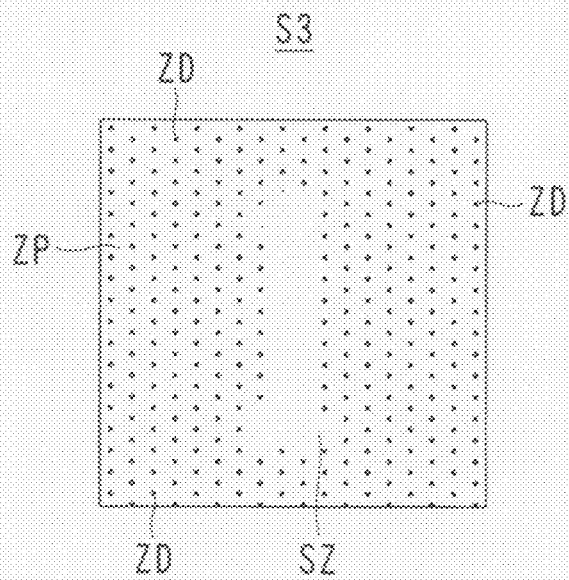

FIG. 3 is a diagram illustrating an operation for duplicating a document performed by the image processing apparatus 1 of the present embodiment, and FIGS. 4A and 4B are diagrams illustrating the reproduction of a latent image.

Hereinafter, descriptions shall be provided regarding a case where an image forming apparatus 60, such as an MFP or the like, which includes the image processing apparatus 1 carries out the operation for duplicating a paper document (called a "security paper document" hereinafter) S1 such as that indicated by (A) in FIG. 3.

A document image GG is configured of a ground design pattern ZP made up of a dot pattern, content CT1 ("ABC . . . XYZ", in (A) in FIG. 3), a specific pattern TP including the password PW and a security level LV, and a latent image SZ; the document image GG is formed on the security paper document S1 indicated in (A) in FIG. 3. The latent image SZ is an image reading "copying prohibited" or the like, which is reproduced in the duplicate, in order to prevent users aside from authorized users from copying the document. Note that although the specific pattern TP and the latent image SZ are shown in (A) in FIG. 3, this is for illustrative purposes, and in reality these items often cannot be seen by the human eye. The latent image SZ illustrated in (A) in FIG. 3 is an "x" mark indicating that copying is prohibited.

However, in cases such as where the password PW has been extracted from the secret information HJ in the specific pattern TP in the security paper document S1 but password authentication has failed, the specific pattern TP is not present in the image data GD, or the like, a duplicate image HG1 composed of a solid black image BP is printed onto copy paper S2, as indicated by (B) in FIG. 3.

In the case where password authentication has failed, the specific pattern TP is not present, or the like, the solid black image BP is printed onto the copy paper S2 in (A) in FIG. 3. However, the image data GD stored in the frame memory 51 may alternatively be deleted and a blank sheet of paper outputted, or a message reading "copying prohibited" may, as described above, be displayed in the display unit 21a of the operational panel 21, without printing out the solid black image BP onto the copy paper S2.

In the case where the specific pattern TP is not present in the security paper document S1, a duplicate image HG2, composed of the ground design pattern ZP, content CT2 ("ABC . . . XYZ", in (C) in FIG. 3), and the latent image SZ, is printed onto copy paper S3, as indicated by (C) in FIG. 3.

Furthermore, in the case where password authentication has succeeded, a duplicate image HG3, composed of the ground design pattern ZP and the same content CT2 indicated by (C) in FIG. 3, is printed onto copy paper S4, as indicated by (D) in FIG. 3. In this case, the latent image SZ is not reproduced in the copy paper S4.

According to such a method, paper copies made based on the security paper document S1 can be distinguished from one another. Next, a method for reproducing the latent image SZ shall be described.

According to the image processing apparatus 1 of the present embodiment, it is possible to print a copy paper S3 in which the latent image SZ has been reproduced, such as that indicated in FIG. 4B, in the case where a security paper document S1 such as that indicated in FIG. 4A has been duplicated.

As indicated in FIG. 4A, the ground design pattern ZP is configured of a collection of remaining dots ZD, which are in turn configured of a plurality of pixels (for example, four pixels). A latent image SZ, configured of a collection of disappearing dots SD, is also present in the security paper document S1. A single disappearing dot SD is made up of pixels of a specific size (for example, made up of one pixel). Note that although the latent image SZ is shown in FIG. 4A, this is for illustrative purposes, and in reality this often cannot be seen by the human eye.

Setting the intensity value of disappearing dots SD per unit of surface area to be the same as the intensity value of the remaining dots ZD per unit of surface area makes it difficult to visually distinguish the ground design pattern ZP, which is a collection of remaining dots ZD, from the latent image SZ, which is a collection of disappearing dots SD, in the security paper document S1.

When the security paper document S1 shown in FIG. 4A is duplicated, the latent image SZ, which is a collection of disappearing dots SD, disappears, resulting in the latent image SZ being reproduced as a blank area, as shown in FIG. 4B. Note that the shape of the latent image SZ is set as "1" in FIGS. 4A and 4B for simplicity's sake.

Here, the reason why the remaining dots ZD do not disappear, but rather remain, while the disappearing dots SD that make up the latent image SZ do disappear when the security paper document S1, which includes the latent image SZ that is a collection of disappearing dots SD, is duplicated, shall be described.

As described above, the disappearing dots SD are comparatively smaller than the remaining dots ZD, and therefore disappear or undergo a decrease in intensity values due to the properties of the MTF (Modulation Transfer Function) of the optical system of the reading unit 2. That is to say, there are cases where, during reading, the disappearing dots SD are reduced, but do not disappear completely.

In general, a background removal process is executed during image processing after reading. Disappearing dots SD that have not disappeared at the time of reading are deleted as a result of this background removal process.

The "background removal process" refers to deleting the base from the image data GD by subtracting a base level (the signal level of the base) from the image data GD generated by the reading unit 2. For example, when duplicating a document that includes regions in which the base is not white, such as newspapers, colored paper, and the like, those regions can be made white in the duplicate by using the background removal process.

Meanwhile, although the remaining dots ZD are comparatively larger than the disappearing dots SD, the intensity values thereof are reduced by the background removal process. However, the edges of the remaining dots ZD are emphasized through the execution of image modification, which is carried out after the process for determining the regions as mentioned above; therefore, the remaining dots ZD remain in the copy paper S4.

Based on the above, the background removal process can be given as an example of the second modification process for reproducing the latent image SZ by deleting the disappearing dots SD.

An example of the first modification process, carried out by the first modification processing unit 52 to ensure that the latent image SZ is not reproduced by not deleting the disappearing dots SD, and another example of the second modification process, carried out by the second modification processing unit 53 to ensure that the latent image SZ is reproduced by deleting the disappearing dots SD, shall be described hereinafter.

The following can be given as examples of the first modification process: a process that increases the intensity values of the disappearing dots SD using a detection filter (an intensifying process); a process that emphasizes edges (contours) of the disappearing dots SD using an edge enhancement filter (a sharpness process); and a process that smoothes small pits in the image (a closing process).

The most effective of these examples of the first modification process is the intensifying process, followed by the sharpness process and the closing process. These processes may be performed independently in order to shorten the amount of time required for processing, or may be performed in combination with one another in order to sufficiently suppress the disappearance of the disappearing dots SD.

The following can be given as examples of the second modification process: the abovementioned background removal process, which is generally performed in image processing; a process of setting the intensity values of each pixel so that changes in the intensities between adjacent pixels are smoothed (a smoothing process); and a process that smoothes small bumps in the image (an opening process).

Figure 5:
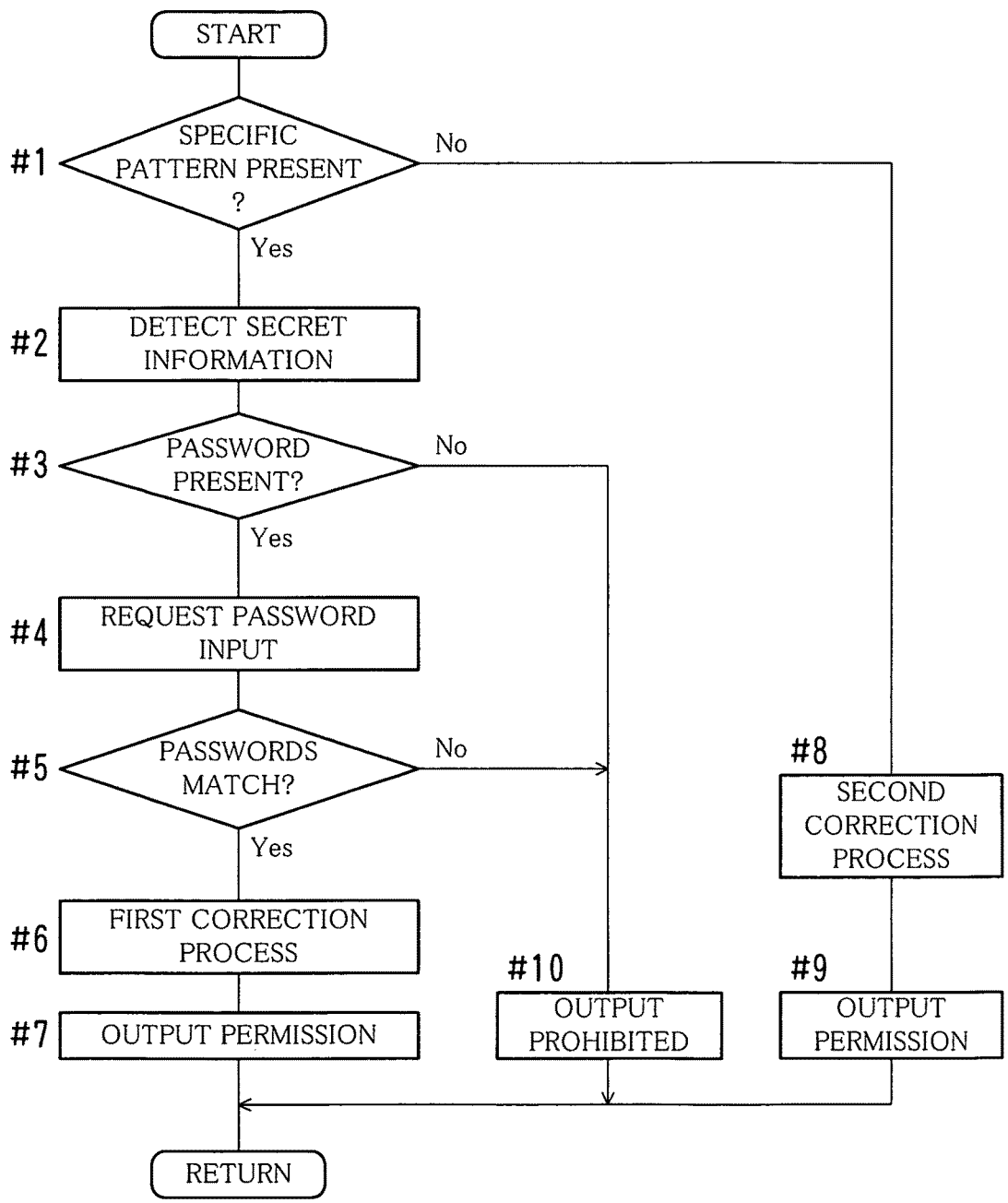
FIG. 5 is flowchart illustrating a duplication process performed by the image processing apparatus according to an embodiment of the present invention.
Figure 6:
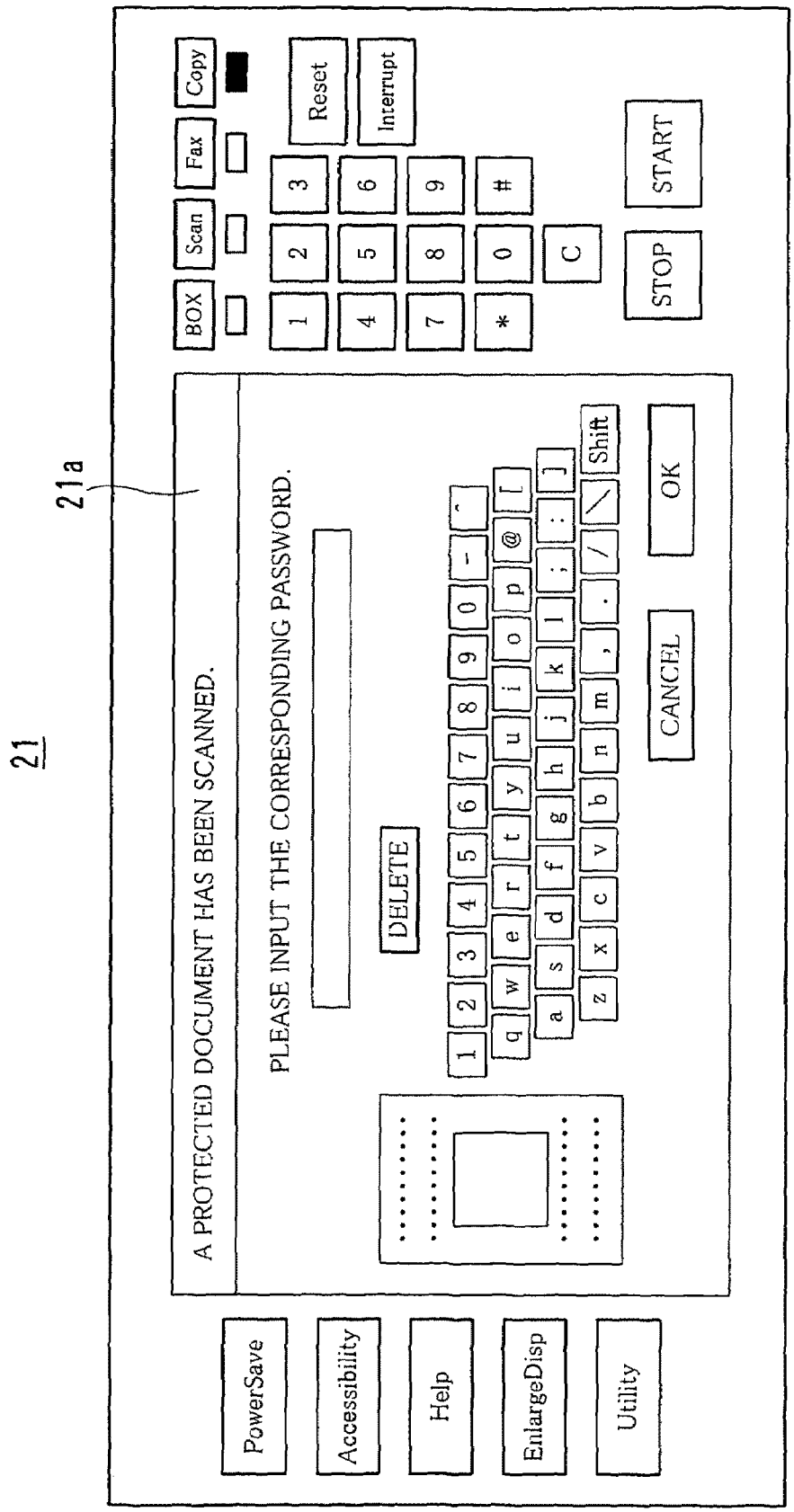
FIG. 6 is a diagram illustrating an example of an operational panel.

FIG. 5 is flowchart illustrating a duplication process performed by the image processing apparatus 1 of the present embodiment, whereas FIG. 6. is a diagram illustrating an example of the operational panel 21.

In FIG. 5, it is first determined whether or not the specific pattern TP is present in the image data GD (#1). If the specific pattern TP is present (Yes in #1), the secret information HJ is detected in the specific pattern TP (#2).

Then, it is determined whether or not the password PW is present in the detected secret information HJ (#3). If the password PW is present in the secret information HJ (Yes in #3), a password input request is carried out (#4). In this case, a password input request is displayed for the user in the display unit 21a of the operational panel 21, as is illustrated in FIG. 6.

It is then determined whether or not the password inputted by the user conforms with the password PW in the secret information HJ (#5). If the password inputted by the user conforms with the password PW in the secret information HJ (Yes in #5), the abovementioned first modification process is carried out on the image data GD (#6). The image data GD1, which has undergone the first modification process, is then outputted (#7).

However, if the specific pattern TP is not present (No in #1), the abovementioned second modification process is carried out on the image data GD (#8). The image data GD2, which has undergone the second modification process, is then outputted (#9).

Furthermore, if the password PW is not present in the secret information HJ (No in #3), or if the password inputted by the user does not conform with the password PW in the secret information (No in #5), the image data GD is not outputted (#10). Note that operations return to general image formation processing following the processes indicated in #7, #9, and #10.

Effects of the Present Invention

In this manner, according to the present embodiment, if the specific pattern TP is present in the image data GD, and the password PW included in the specific pattern TP conforms with the password inputted by the user, the first modification process is carried out on the image data GD so that the latent image SZ, made up of characters reading "copying prohibited" or the like, is not reproduced in the copy paper S4, which is obtained by duplicating the security paper document S1. Through this, it is possible to ensure that the latent image SZ is not reproduced in the copy paper S4, and that a duplicate identical to the security paper document S1 in appearance can be obtained, when a user has been authenticated as an authorized user. It is thus easy for an authorized user to recognize the duplicate image HG3 in the copy paper S4.

Other Embodiments

In the above embodiment, the first modification process performed by the first modification processing unit 52 was described as a process for ensuring that the latent image SZ is not reproduced by not deleting the disappearing dots SD; however, the same effects can be obtained by not executing the second modification process, which is generally carried out during image processing.

Furthermore, in the above embodiment, a user is authenticated as an authorized user if the password PW in the specific pattern TP conforms with the password inputted by the user, but the present invention is not intended to be limited hereto. That is, the user may be authenticated as an authorized user if the password inputted by that user conforms with a password registered in advance, or through biometric authentication utilizing the voice, fingerprints, or the like of the user.

Moreover, the configuration, processing content, processing order, and so on of the image processing apparatus 1 in its entirety or the various constituent elements included therein may be altered as appropriate within the spirit of the present invention. The abovementioned unique and distinguished effects can be attained in such a case as well.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus capable of reading a document that has a ground design and carrying out image processing, the apparatus comprising:
    a latent image visualizing portion that visualizes a latent image included in the ground design;
    a first modification processor that carries out a modification process comprising at least intensifying a portion of the latent image so that the latent image included in the ground design is not visualized;
    an authenticating portion that performs authentication regarding whether or not a user is an authorized user of the document; and
    a controller that performs control so that the modification process is performed by the first modification processor in order for the latent image included in the ground design not to be visualized, or performs control so that the latent image included in the ground design is not visualized by the latent image visualizing portion, only when the user has been authenticated as an authorized user of the document.

2. The image processing apparatus according to claim 1, wherein the authenticating portion includes a detector that detects a specific pattern included in the ground design, and a password extractor that extracts a password from the specific pattern included in the ground design for authenticating a user as an authorized user of the document; and
    the user is authenticated as an authorized user of the document in the case where a password inputted by the user conforms with the password extracted by the password extractor.

3. The image processing apparatus according to claim 1, wherein the authenticating portion authenticates a user as an authorized user of the document in the case where a password inputted by the user conforms with a password registered in advance.

4. The image processing apparatus according to claim 1, wherein the authenticating portion authenticates a user as an authorized user of the document in the case where the user has been authenticated as an authorized user by biometric authentication.

5. The image processing apparatus according to claim 1, wherein the latent image included in the ground design is formed of a combination of a disappearing dot group made up of dots having a comparatively small size and a remaining dot group made up of dots having a comparatively large size; and
    the first modification processor causes the latent image included in the ground design not to be visualized by performing at least one process selected from a group consisting of an intensifying process, a sharpness process, and a closing process on the disappearing dot group.

6. An image processing method employing a copy machine capable of reading a document that has a ground design including a latent image and duplicating the document, the image processing method comprising the steps of:
    obtaining image data by reading the document using a reading portion;
    performing authentication regarding whether or not a user is an authorized user of the document based on an input from the user;
    modifying the image data by at least intensifying a portion of the latent image so that the latent image is not visualized, in the case where the user has been authenticated as an authorized user of the document; and
    printing the modified image data.

7. The image processing method according to claim 6, wherein the performing includes detecting a specific pattern included in the ground design, and extracting a password from the specific pattern included in the ground design for authenticating a user as an authorized user of the document; and
    the user is authenticated as an authorized user of the document in the case where a password inputted by the user conforms with the password extracted in the extracting.

8. The image processing method according to claim 6, wherein in the performing, a user is authenticated as an authorized user of the document in the case where a password inputted by the user conforms with a password registered in advance.

9. The image processing method according to claim 6, wherein in the performing, a user is authenticated as an authorized user of the document in the case where the user has been authenticated as an authorized user by biometric authentication.

10. The image processing method according to claim 6, wherein the latent image is formed of a combination of a disappearing dot group made up of dots having a comparatively small size and a remaining dot group made up of dots having a comparatively large size; and
    in the modifying, the latent image is not caused to be visualized by performing at least one process selected from a group consisting of an intensifying process, a sharpness process, and a closing process on the disappearing dot group.

11. A non-transitory computer-readable recording medium having stored thereon a program used for reading a document that has a ground design including a latent image and duplicating the document, the program causing a computer to execute the steps of:

obtaining image data by reading the document using a reading portion;

performing authentication regarding whether or not a user is an authorized user of the document based on an input from the user;

modifying the image data by at least intensifying a portion of the latent image so that the latent image is not visualized, only when the user has been authenticated as an authorized user of the document; and printing the modified image data.

12. The recording medium according to claim 11, wherein the performing includes detecting a specific pattern included in the ground design, and extracting a password from the specific pattern included in the ground design for authenticating a user as an authorized user of the document; and in the performing, the user is authenticated as an authorized user of the document in the case where a password inputted by the user conforms with the password extracted in the extracting.

13. The recording medium according to claim 11, wherein in the performing, a user is authenticated as an authorized user of the document in the case where a password inputted by the user conforms with a password registered in advance.

14. The recording medium according to claim 11, wherein in the performing, a user is authenticated as an authorized user of the document in the case where the user has been authenticated as an authorized user by biometric authentication.

15. The recording medium according to claim 11, wherein the latent image is formed of a combination of a disappearing dot group made up of dots having a comparatively small size and a remaining dot group made up of dots having a comparatively large size; and in the modifying, the latent image is not caused to be visualized by performing at least one process selected from a group consisting of an intensifying process, a sharpness process, and a closing process on the disappearing dot group.

16. The image processing apparatus according to claim 1:

wherein the ground design and the latent image each comprise a plurality of dots, a first portion of the dots forming the latent image being smaller than the dots forming the ground design;

wherein the latent image visualizing portion visualizes the latent image by de-intensifying or deleting the first portion of dots forming the latent image; and wherein the modification process of the first modification processor comprises at least intensifying the first portion of dots forming the latent image so that the latent image is visually indistinguishable from the ground design.

17. The image processing method according to claim 6:

wherein the ground design and the latent image each comprise a plurality of dots, a first portion of the dots forming the latent image being smaller than the dots forming the ground design; and wherein the modification of the image data comprises at least intensifying the first portion of dots forming the latent image so that the latent image is visually indistinguishable from the ground design when the modified image data is printed.

18. The recording medium according to claim 11:

wherein the ground design and the latent image each comprise a plurality of dots, a first portion of the dots forming the latent image being smaller than the dots forming the ground design; and wherein the modification of the image data comprises at least intensifying the first portion of dots forming the latent image so that the latent image is visually indistinguishable from the ground design when the modified image data is printed.

* * * * *